US012309052B2

(12) United States Patent
Song et al.

(10) Patent No.: US 12,309,052 B2
(45) Date of Patent: May 20, 2025

(54) PACKET PROCESSING METHOD, EDGE DEVICE, AND COMPUTER-READABLE STORAGE MEDIUM

(71) Applicant: ZTE CORPORATION, Guangdong (CN)

(72) Inventors: Bing Song, Guangdong (CN); Yao Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 152 days.

(21) Appl. No.: 18/024,523

(22) PCT Filed: Aug. 11, 2021

(86) PCT No.: PCT/CN2021/112119
§ 371 (c)(1),
(2) Date: Mar. 3, 2023

(87) PCT Pub. No.: WO2022/048417
PCT Pub. Date: Mar. 10, 2022

(65) Prior Publication Data
US 2023/0370358 A1 Nov. 16, 2023

(30) Foreign Application Priority Data
Sep. 3, 2020 (CN) .......................... 202010915838.9

(51) Int. Cl.
H04L 45/02 (2022.01)
H04L 12/46 (2006.01)
H04L 45/50 (2022.01)

(52) U.S. Cl.
CPC .......... H04L 45/02 (2013.01); H04L 12/4641 (2013.01); H04L 45/50 (2013.01)

(58) Field of Classification Search
CPC ..... H04L 45/02; H04L 12/4641; H04L 45/50; H04L 45/125; H04L 45/121; H04L 45/24; H04L 45/741; H04L 45/34; H04L 45/586
See application file for complete search history.

(56) References Cited

U.S. PATENT DOCUMENTS

2004/0177157 A1  9/2004  Mistry et al.
2009/0116483 A1  5/2009  Anumala
(Continued)

FOREIGN PATENT DOCUMENTS

CN  106034072 A  10/2016
CN  106850380 A  6/2017
(Continued)

OTHER PUBLICATIONS

European Patent Office, The extended European search report issued Apr. 5, 2024 for application No. EP21863484.8.
(Continued)

Primary Examiner — Soe Hlaing
(74) Attorney, Agent, or Firm — Li & Cai Intellectual Property (USA) Office

(57) ABSTRACT

The present disclosure provides a packet processing method applied to a first edge device, including: sending a route advertisement message of a virtual private network to a second edge device, the route advertisement message indicating whether the first edge device supports a first network architecture and whether the first edge device supports a second network architecture, the first edge device supporting at least one of the first network architecture or the second network architecture; and receiving a second service packet sent by the second edge device, where the second service packet is obtained by the second edge device in response to a first service packet according to the network architecture supported by the first edge device. The present disclosure further provides a packet processing method applied to a (Continued)

second edge device, an edge device, and a computer-readable storage medium.

17 Claims, 5 Drawing Sheets

(56) References Cited

U.S. PATENT DOCUMENTS

2018/0375763 A1* 12/2018 Brissette ................ H04L 67/63
2020/0127913 A1*  4/2020 Filsfils ................. H04L 45/741

FOREIGN PATENT DOCUMENTS

| CN | 110535766 | A | 12/2019 |
| CN | 110830352 | A | 2/2020 |
| CN | 112511423 | A | 3/2021 |
| EP | 2933958 | A1 | 10/2015 |
| EP | 3402141 | A1 | 11/2018 |

OTHER PUBLICATIONS

WIPO, International Search Report issued on Oct. 27, 2021.
China Patent Office, the Office action dated Feb. 20, 2025, for corresponding CN application No. 202010915838.9.

\* cited by examiner

S01

> Identifying the instance by using the first network identifier and the second network identifier, and configuring at least one of a function field or an argument field of the second network identifier according to a label value of the first network identifier — S01a

> Identifying the instance by using the first network identifier, and establishing a mapping relationship between the first network identifier and the second network identifier in a forwarding table — S01b

> Establishing a border gateway protocol (BGP) neighbor relationship with the second edge device, and sending the route advertisement message to the second edge device based on the BGP — S1a

> Establishing a BGP neighbor relationship with a route reflector — S101b

> Sending the route advertisement message to the second edge device through the route reflector — S102b

FIG. 6

PACKET PROCESSING METHOD, EDGE DEVICE, AND COMPUTER-READABLE STORAGE MEDIUM

CROSS-REFERENCE TO RELATED APPLICATIONS

The present application claims the priority of Chinese Patent Application No. 202010915838.9, filed on Sep. 3, 2020, the contents of which are incorporated herein in their entirety by reference.

TECHNICAL FIELD

The present disclosure relates to the field of communication technologies, and in particular, to a packet processing method, an edge device, and a computer-readable storage medium.

BACKGROUND

As an important network service, a virtual private network (VPN) is desired to be conveniently and flexibly deployed in a hybrid network with various network architectures, and is desired to be beneficial to upgrade and modify the hybrid network.

At present, for the hybrid network with various network architectures, a main design idea is that, for traffic forwarding, packet formats are converted between domains corresponding to different network architectures through edge devices, resulting in a relatively low forwarding efficiency, and in a case where some devices in any domain do not support another network architecture, especially the devices are not continuous on a path, the packet formats are converted many times, and the forwarding efficiency is further reduced, which is not conducive to end-to-end operation and maintenance.

For any service, during advertising a route, two routes are advertised respectively corresponding to forwarding planes of different network architectures, but if a desired route is to be selected, since only one network architecture can take effect at any time, problems of resource occupation and efficiency reduction exist; in addition, since two routes are advertised, a problem of the routes being unsynchronized may be encountered, for example, if the service fails and the two routes are to be withdrawn, if withdrawal sequences of the two routes are different, a forwarding fault may be caused in a withdrawal process.

SUMMARY

In a first aspect, the present disclosure provides a packet processing method, applied to a first edge device, including: sending a route advertisement message of a virtual private network to a second edge device, the route advertisement message indicating whether the first edge device supports a first network architecture and whether the first edge device supports a second network architecture, the first edge device supporting at least one of the first network architecture or the second network architecture; and receiving a second service packet sent by the second edge device, the second service packet being obtained by the second edge device in response to a first service packet according to the network architecture supported by the first edge device.

In a second aspect, the present disclosure further provides a packet processing method, applied to a second edge device, including: receiving a route advertisement message of a virtual private network sent by a first edge device, the route advertisement message indicating whether the first edge device supports a first network architecture and whether the first edge device supports a second network architecture, the first edge device supporting at least one of the first network architecture or the second network architecture; and in response to a first service packet received by the first edge device serving as a receiving object, obtaining a second service packet according to the network architecture supported by the first edge device, and sending the second service packet to the first edge device through a path corresponding to the network architecture.

In a third aspect, the present disclosure further provides an edge device, including: at least one processor; and a storage component storing at least one program; the at least one program, when executed by the at least one processor, causes the at least one processor to perform the packet processing method applied to the first edge device as described in the first aspect.

In a fourth aspect, the present disclosure further provides an edge device, including: at least one processor; and a storage component storing at least one program stored therein; the at least one program, when executed by the at least one processor, causes the at least one processor to perform the packet processing method applied to the second edge device as described in the second aspect.

In a fifth aspect, the present disclosure further provides a computer-readable storage medium having a computer program stored thereon, the computer program, when executed by a processor, causes the processor to perform at least one of the packet processing method applied to the first edge device as described in the first aspect or the packet processing method applied to the second edge device as described in the second aspect.

BRIEF DESCRIPTION OF DRAWINGS

FIG. 3 is a flowchart illustrating an implementation of operation S01 according to the present disclosure;

FIG. 4 is a flowchart illustrating an implementation of operation S01 according to the present disclosure;

FIG. 5 is a flowchart illustrating an implementation of operation S1 according to the present disclosure;

FIG. 6 is a flowchart illustrating an implementation of operation S1 according to the present disclosure;

DETAIL DESCRIPTION OF EMBODIMENTS

Figure 1A:
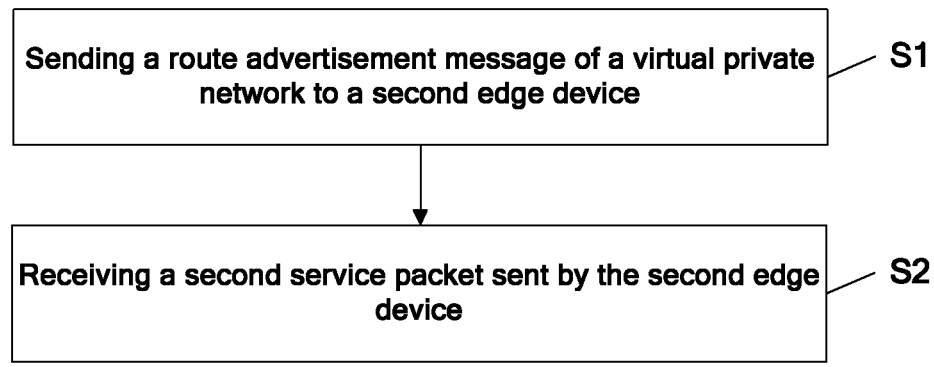
FIG. 1a is a flowchart of a packet processing method according to the present disclosure.

In order to make those skilled in the art better understand the technical solutions of the present disclosure, a packet processing method, an edge device, and a computer-readable storage medium provided in the present disclosure are further described in detail below with reference to the accompanying drawings.

Exemplary embodiments are described in detail below with reference to the accompanying drawings, but may be embodied in different forms, and should not be construed as a limitation. The embodiments are illustrated to make the present disclosure thorough and complete, and for those skilled in the art fully understanding the scope of the present disclosure.

The terms used in the present disclosure are for a purpose of describing particular embodiments only, and are not intended to limit the present disclosure. As used in the present disclosure, singular forms "a" and "the" are intended to include plural forms as well, i.e., to represent at least one, unless the context clearly defines otherwise. It should further be understood that terms "includes/comprises" and/or "made of/consisted of" in the present disclosure are used to specify a presence of at least one of recited features, integers, steps, operations, elements or components, but do not preclude a presence or an addition of at least one of other features, integers, steps, operations, elements, components or groups thereof.

It should be understood that the terms "first", "second" and the like in the present disclosure are used for describing various elements, but the various elements are not limited by the terms. The terms are only used to distinguish one element from another. Thus, a first element, a first component, or a first module discussed below could be termed a second element, a second component, or a second module without departing from the teachings of the present disclosure.

Unless otherwise defined, meanings of all terms (including technical terms and scientific terms) used herein are same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

A packet processing method, an edge device, and a computer-readable storage medium provided in the present disclosure can be used for each edge device supporting various network architectures, and during advertising the route, all network architectures supported by the edge device are indicated in one route advertisement message, so that an efficiency of advertising the route is improved, system resources are not to be occupied unnecessarily during selecting the route, and a problem of routes being unsynchronized is avoided.

The first edge device and the second edge device related in the present disclosure may be a provider edge (PE), an autonomous system boundary router (ASBR), an area border router (ABR), or the like, the virtual private network (VPN) may be a Layer2 VPN (L2VPN), an Ethernet VPN (EVPN), a Layer3 VPN (L3VPN), or the like.

FIG. 1a is a flowchart of a packet processing method according to the present disclosure. As shown in FIG. 1a, the packet processing method is applied to a first edge device, and includes following operations S1 and S2.

At operation S1, sending a route advertisement message of a virtual private network to a second edge device.

The route advertisement message may indicate whether the first edge device supports a first network architecture and whether the first edge device supports a second network architecture, the first edge device supports at least one of the first network architecture or the second network architecture. In operation S1, the route advertisement message for the VPN is sent to the second edge device, and indicates whether the first edge device supports at least one of the first network architecture or the second network architecture, the advertisement message indicating that the first edge device supports a certain network architecture means that the first edge device has a capability of supporting the network architecture, or actually has a capability of supporting the network architecture in a route of the current VPN.

In some implementations, the route advertisement message includes flag information, and a first network identifier and a second network identifier respectively corresponding to the first network architecture and the second network architecture; the flag information being valid indicates that the first edge device supports the first network architecture and the second network architecture, the flag information being invalid indicates that the first edge device supports the first network architecture or the second network architecture; in addition, the first network identifier and the second network identifier are associated with the virtual private network. Specifically, the flag information may be in a form of a flag bit or a specific field; alternatively, in some implementations, a way of negotiating the capability of the device is used for indicating whether the first edge device supports the first network architecture and the second network architecture.

In some implementations, the first network identifier is a multi-protocol label switching (MPLS) label, the second network identifier is a Segment Routing Internet protocol version 6 (SRv6) segment identifier (SRv6 SID), correspondingly, the first network architecture is an MPLS architecture, the second network architecture is an SRv6 architecture. Certainly, the definition of specific types of the first network identifier and the second network identifier described above is only exemplary implementation in the present disclosure, the terms "first" and "second" are used for distinguishing one network identifier from another network identifier, but not for limiting the technical solution of the present disclosure.

Specifically, segment routing (SR) is a routing manner based on a source address, by carrying a segment routing header (SRH) in a packet header corresponding to the MPLS architecture or a packet header of an Internet protocol version 6 (IPv6), the SRH carries a series of indication operations (also called segment operations) for indicating routing and transmission of data in a network.

The SRv6 SID is a network instruction, includes a locator field (Locator), a function field (Function), an argument field (Argument), and the like; the locator field is mainly responsible for a routing function and is unique in a segment routing domain; the function field is used for identifying functions of the device, such as forwarding function, service function, and the like. The SRv6 SID associated with the VPN is carried in the SRv6 Service TLV, and in some implementations, if the route is advertised based on the border gateway protocol (BGP), the SRv6 Service TLV is carried in the BGP prefix attribute.

Figure 1B:
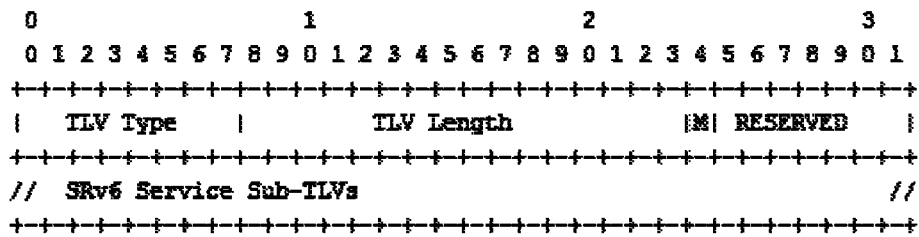
FIG. 1b is a schematic diagram of a format of an SRv6 Service TLV according to the present disclosure.

FIG. 1b is a schematic diagram of a format of an SRv6 Service TLV according to the present disclosure. As shown in FIG. 1b, the SRv6 Service TLV includes Type, Length, Value, flag bit M and RESERVED, and the Value is embodied as SRv6 Service Sub-TLVs. If the flag bit M is set to 0, i.e., the flag bit is invalid, which indicates that the route and the edge device corresponding to the route only support the SRv6 architecture; if the flag bit M is set to 1, i.e., the flag bit is valid, which indicates that the route and the edge device corresponding to the route support both the MLPS architecture and the SRv6 architecture. It should be noted that the above Type, Length, Value, flag bit M and RESERVED, are all specific labels or field names used in practical applications.

At operation S2, receiving a second service packet sent by the second edge device.

The second service packet is obtained by the second edge device in response to a first service packet according to the network architecture supported by the first edge device, and the first service packet is received by the first edge device serving as a receiving object.

In some implementations, the route advertisement message includes a flag bit, the first network architecture and the second network architecture, and if the flag bit is valid, the second service packet carries the first network identifier or the second network identifier which is selected by the second edge device according to a preset path selection policy and is encapsulated in the second service packet.

In some implementations, after operation S2 of the receiving a second service packet sent by the second edge device, the packet processing method further includes: searching a forwarding table according to the second service packet and forwarding the second service packet.

The packet processing method provided in the present disclosure can be used for each edge device supporting various network architectures, and during advertising the route, all network architectures supported by the edge device are indicated in one route advertisement message, so that the efficiency of advertising the route is improved, system resources are not to be occupied unnecessarily during selecting the route, and the problem of routes being unsynchronized is avoided.

Figure 2:
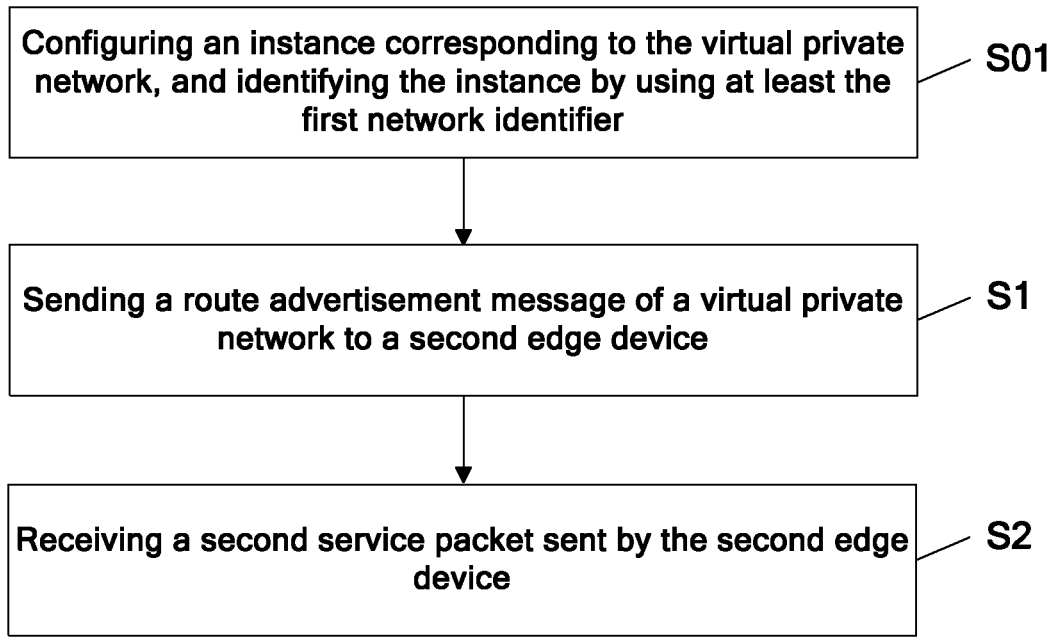
FIG. 2 is a flowchart of a packet processing method according to the present disclosure.

FIG. 2 is a flowchart of a packet processing method according to the present disclosure. As shown in FIG. 2, an implementation based on the method as shown in FIG. 1a is illustrated. Specifically, before operation S1 of the sending a route advertisement message of a virtual private network to a second edge device, the packet processing method further includes operation S01.

At operation S01, configuring an instance corresponding to the VPN, and identifying the instance by using at least the first network identifier.

The instance corresponding to the VPN is a VPN instance, and may be only identified by the first network identifier, or may be respectively and independently identified by the first network identifier and the second network identifier.

FIG. 3 is a flowchart illustrating an implementation of operation S01 according to the present disclosure. Specifically, the first edge device supports the first network architecture and the second network architecture; and as shown in FIG. 3, operation S01 of the identifying the instance by using at least the first network identifier includes operation S01a.

At operation S01a, identifying the instance by using the first network identifier and the second network identifier, and configuring at least one of a function field or an argument field of the second network identifier according to a label value of the first network identifier.

Specifically, the first network identifier is an MPLS label, and the second network identifier is an SRv6 SID, and in such case, independent forwarding tables respectively corresponding to two network architectures are expected to be maintained; in an existing standard, the edge device only supporting the MPLS architecture is represented by carrying the MPLS label, which is not compatible with the SRv6 SID; for the edge device supporting the SRv6 architecture, following modes may be adopted: whether or not the edge device supports the MPLS architecture, a field corresponding to the MPLS label is set to be Implicit NULL, or a field position corresponding to the MPLS label is taken as a position of a functional field or an argument field of the SRv6 SID, that is to represent that it has nothing to do with the MPLS architecture, and make the MPLS label invalid; thus, in operation S01a, the functional field or the argument field of the SRv6 SID is configured according to a label value of the MPLS label, an association relationship between network identifiers is established, so that advertising whether two network architectures are supported and increasing compatibility with the existing standard can be implemented simultaneously.

FIG. 4 is a flowchart illustrating an implementation of operation S01 according to the present disclosure. Specifically, the first edge device supports the first network architecture and the second network architecture; as shown in FIG. 4, operation S01 of the identifying the instance by using at least the first network identifier includes operation S01b.

At operation S01b, identifying the instance by using the first network identifier, and establishing a mapping relationship between the first network identifier and the second network identifier in a forwarding table.

By identifying the instance with the first network identifier only, only the forwarding table indexed by the first network identifier is to be maintained locally, and if a packet carrying the second network identifier is received, a corresponding first network identifier is determined according to the mapping relationship, and the forwarding table is searched, so that system resources expected by forwarding table items are not doubled although two network architectures are supported simultaneously, and a structure of the forwarding table of the existing virtual private network is not to be changed.

FIG. 5 is a flowchart illustrating an implementation of operation S1 according to the present disclosure. As shown in FIG. 5, operation S1 of the sending a route advertisement message of a virtual private network to a second edge device includes operation S1a.

At operation S1a, establishing a border gateway protocol (BGP) neighbor relationship with the second edge device, and sending the route advertisement message to the second edge device based on the BGP.

In operation S1a, a VPN route is advertised by directly establishing the BGP neighbor relationship with the second edge device.

FIG. 6 is a flowchart illustrating an implementation of operation S1 according to the present disclosure. As shown in FIG. 6, operation S1 of the sending a route advertisement message of a virtual private network to a second edge device includes operations S101b and S102b.

At operation S101b, establishing a BGP neighbor relationship with a route reflector (RR).

The RR establishes the BGP neighbor relationship with the second edge device and supports the first network architecture and the second network architecture.

At operation S102b, sending the route advertisement message to the second edge device through the route reflector.

In some implementations, operation S102b of the sending the route advertisement message to the second edge device through the route reflector includes: sending the route advertisement message to the route reflector, so that the route reflector transparent-transfers the route advertisement message to the second edge device, i.e., the route reflector does not process the route advertisement message and directly transfers the route advertisement message to other route devices; or, sending the route advertisement message to the route reflector, so that the route reflector sends the route advertisement message only carrying the network identifier corresponding to the network architecture supported by the second edge device to the second edge device according to the network architecture supported by the second edge device, i.e., the route reflector processes the route advertisement message according to a capability of the edge device for subsequently receiving the route advertisement message, and only advertises the VPN route supported by the edge device.

Figure 7:
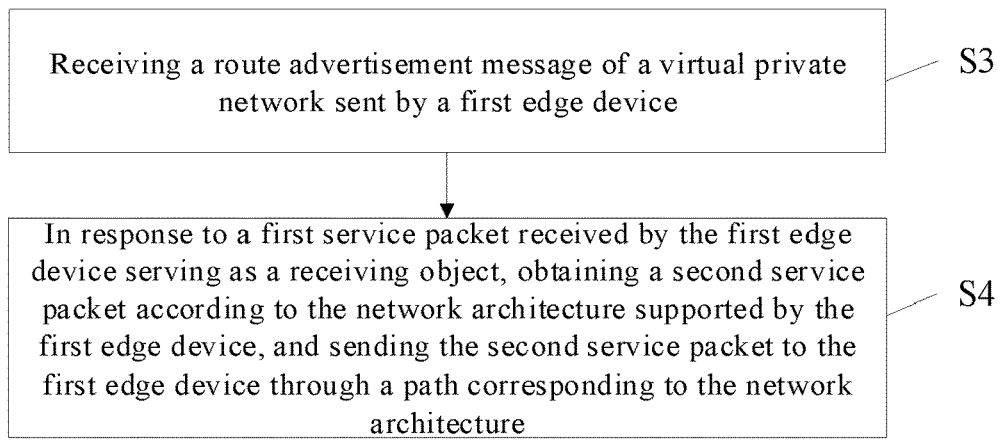
FIG. 7 is a flowchart of a packet processing method according to the present disclosure.

FIG. 7 is a flowchart of a packet processing method according to the present disclosure. And as shown in FIG. 7, the packet processing method is applied to a second edge device, including following operations S3 and S4.

At operation S3, receiving a route advertisement message of a virtual private network sent by a first edge device.

The route advertisement message may indicate whether the first edge device supports a first network architecture and whether the first edge device supports a second network architecture, the first edge device supports at least one of the first network architecture or the second network architecture.

In some implementations, corresponding to the packet processing method applied to the first edge device, the route advertisement message includes a flag bit, and a first network identifier and a second network identifier respectively corresponding to the first network architecture and the second network architecture; the flag bit being valid, indicates that the first edge device supports the first network architecture and the second network architecture, the flag bit being invalid indicates that the first edge device supports the first network architecture or the second network architecture. In some implementations, the first network identifier is an MPLS label, the second network identifier is an SRv6 SID.

At operation S4, in response to a first service packet received by the first edge device serving as a receiving object, obtaining a second service packet according to the network architecture supported by the first edge device, and sending the second service packet to the first edge device through a path corresponding to the network architecture.

The first service packet received by the first edge device serving as the receiving object means that content in the first service packet are sent to the first edge device or a user device connected with the first edge device. In response to the first service packet received by the first edge device serving as the receiving object, the second service packet is obtained according to the network architecture supported by the first edge device, that is, after the first service packet is received, a corresponding forwarding table is searched according to the first service packet, after searching the forwarding table, according to the network architecture supported by the first edge device which is determined based on a corresponding strategy, the first service packet is encapsulated, so as to generate the second service packet. In some implementations, the network architecture supported by the first edge device may be selected based on a result of local computation, content of an interior gateway protocol (IGP) advertisement, a policy pre-issued or configured by a system, and/or a result of path computation requested from a controller after the first service packet is received.

The packet processing method provided in the present disclosure can be used for each edge device supporting various network architectures, and during advertising the route, all network architectures supported by the edge device are indicated in one route advertisement message, the efficiency of advertising the route is improved, and for traffic forwarding of an opposite device, a service packet is generated and sent according to the network architecture supported by the opposite device, system resources are not to be occupied unnecessarily for a decision process, and the forwarding efficiency is not affected.

Figure 8:
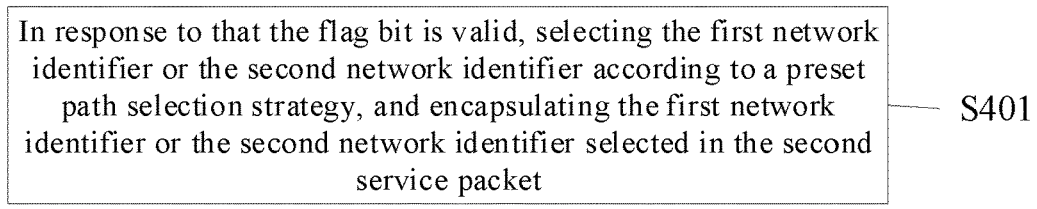
FIG. 8 is a flowchart illustrating an implementation of operation S4 according to the present disclosure.

FIG. 8 is a flowchart illustrating an implementation of operation S4 according to the present disclosure. The route advertisement message includes a flag bit, a first network architecture and a second network architecture; as shown in FIG. 8, operation S4 of the obtaining a second service packet according to the network architecture supported by the first edge device includes operation S401.

At operation S401, in response to that the flag bit is valid, selecting the first network identifier or the second network identifier according to a preset path selection strategy, and encapsulating the first network identifier or the second network identifier selected in the second service packet.

Figure 9:
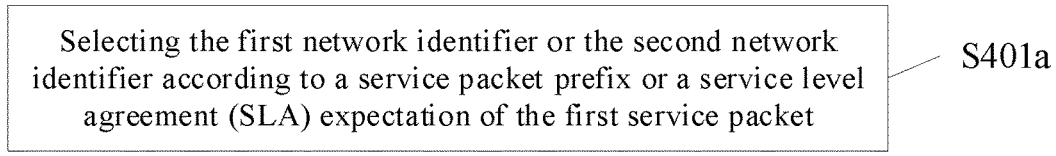
FIG. 9 is a flowchart illustrating an implementation of operation S401 according to the present disclosure.

FIG. 9 is a flowchart illustrating an implementation of operation S401 according to the present disclosure. As shown in FIG. 9, operation S401 of the selecting the first network identifier or the second network identifier according to a preset path selection strategy includes operation S401a.

At operation S401a, selecting the first network identifier or the second network identifier according to a service packet prefix or a service level agreement (SLA) expectation of the first service packet.

In operation S401a, the network architecture is selected according to an expectation of the corresponding service, and a specific path is determined thereafter.

Figure 10:
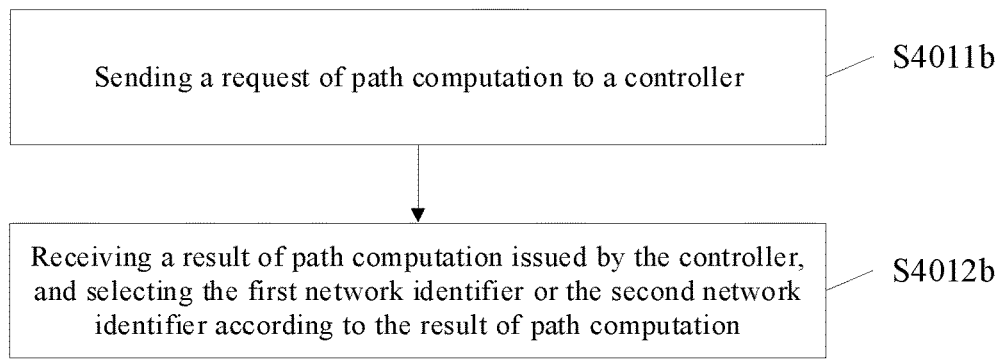
FIG. 10 is a flowchart illustrating an implementation of operation S401 according to the present disclosure.

FIG. 10 is a flowchart illustrating an implementation of operation S401 according to the present disclosure. As shown in FIG. 10, operation S401 of the selecting the first network identifier or the second network identifier according to a preset path selection strategy includes operations S4011b and S4012b.

At operation S4011b, sending a request of path computation to a controller.

The request of path computation includes constraint information including at least one of a delay expectation and a bandwidth expectation; a sending of the request of path computation and an issuing of a subsequent result of path computation of the controller may be performed based on a network configuration protocol (NETCONF), a path computation element protocol (PCEP), a BGP, or the like.

At operation S4012b, receiving a result of path computation issued by the controller, and selecting the first network identifier or the second network identifier according to the result of path computation.

In some implementations, the first edge device and the second edge device each support the first network architecture and the second network architecture; the request of path computation further includes the first network identifier, the second network identifier and a multi-path computation flag. Specifically, the multi-path computation flag is configured to indicate the controller to respectively compute paths corresponding to the first network identifier and the second network identifier, or indicate the controller to compute a desired path from the paths corresponding to the first network identifier and the second network identifier.

Figure 11:
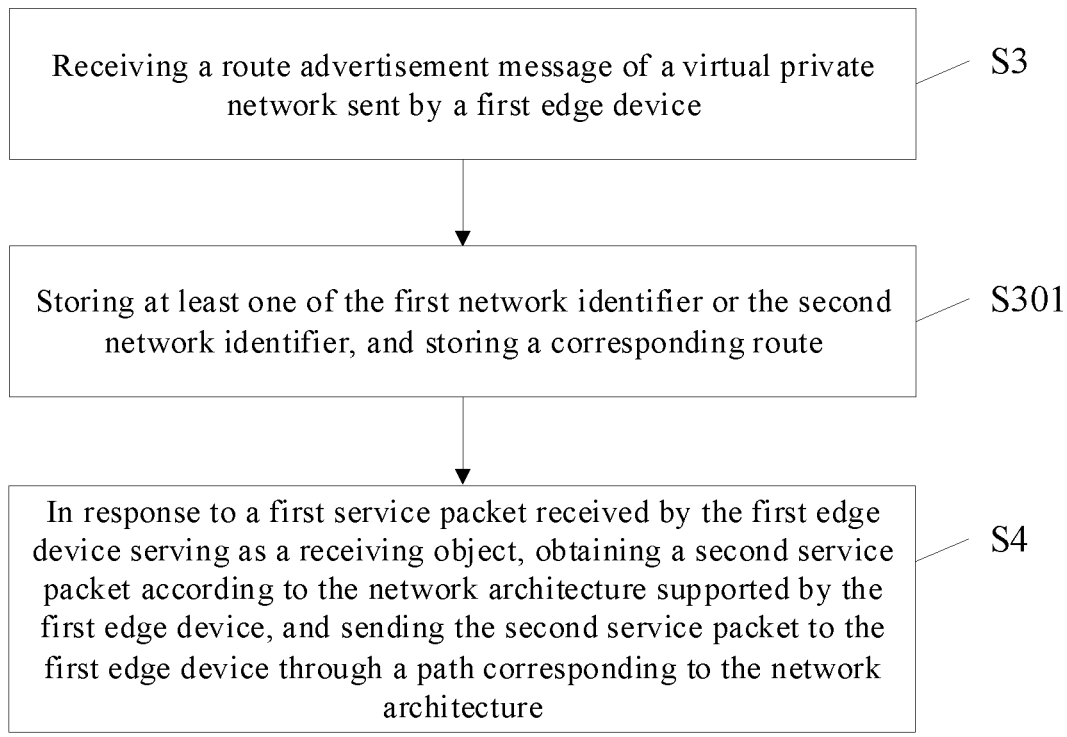
FIG. 11 is a flowchart of a packet processing method according to the present disclosure.

FIG. 11 is a flowchart of a packet processing method according to the present disclosure. As shown in FIG. 11, an implementation based on the method shown in FIG. 7 is illustrated. The route advertisement message includes flag information, the first network architecture and the second network architecture; after operation S3 of the receiving a route advertisement message of a virtual private network sent by a first edge device, the packet processing method further includes operation S301.

At operation S301, storing at least one of the first network identifier or the second network identifier, and storing a corresponding route.

In operation S301, the network identifier and the corresponding VPN route are stored according to a corresponding storage policy and a routing policy.

In some implementations, operation S301 of the storing at least one of the first network identifier or the second network identifier, and storing a corresponding route includes: storing at least one of the first network identifier or the second network identifier according to whether the second edge device supports the first network architecture and/or the second network architecture, and storing the corresponding route, i.e., based on device granularity, only storing the network identifier and the virtual private network route corresponding to the network architecture supported by the device; or, storing at least one of the first network identifier or the second network identifier according to a configured instance of the second edge device, and storing the corresponding route, i.e., based on VPN instance granularity, storing the network identifier and the virtual private network route corresponding to the configured instance.

The packet processing method provided in the present disclosure can be used to store the corresponding network identifier and the route according to a capability of the device, and avoid performing corresponding computation on any unnecessary route during selecting a desired route for traffic forwarding.

The packet processing method provided in the present disclosure is described in detail below with reference to the practical applications.

Figure 12:
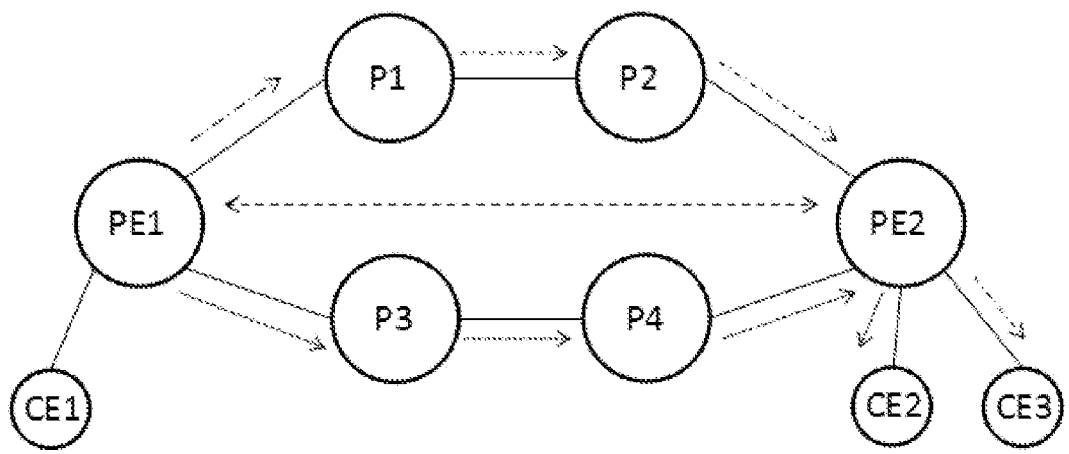
FIG. 12 is a schematic structural diagram of a networking of a virtual private network according to the present disclosure.

FIG. 12 is a schematic structural diagram of a networking of a virtual private network according to the present disclosure. As shown in FIG. 12, the virtual private network is a Layer3 VPN based on the IPv6; a first customer edge router CE1, a second customer edge router CE2, and a third customer edge router CE3 are customer edge routers (CE), a first provider edge router PE1 and a second provider edge router PE2 are provider edge routers, a first provider core router P1, a second provider core router P2, a third provider core router P3, and a fourth provider core router P4 are provider core routers (P), CE1 and CE2 already belong to the virtual private network and are connected, and CE1 and CE3 are to be connected with each other; PE1, PE2, P1, P3 and P4 all support an MPLS architecture and an SRv6 architecture simultaneously, and P2 is not upgraded and only supports the MPLS architecture.

PE1 allocates an MPLS label VPN1 and an SRv6 segment identifier SID1 to CE1, PE2 allocates an MPLS label VPN2 and an SRv6 segment identifier SID2 to CE2, PE2 allocates an MPLS label VPN3 and an SRv6 segment identifier SID3 to CE3, and allocated SRv6 segment identifiers are of an END.DX4 type, and each PE maintains an independent forwarding table for MPLS labels and an independent forwarding table for SRv6 SIDS.

PE2 establishes a BGP neighbor relationship (shown in a form of a dotted line in FIG. 12) with PE1, advertising the route to PE1 based on a BGP, and respectively sends route advertisement messages with a route prefix of CE2 and a route prefix of CE3, each route advertisement message carries the corresponding MPLS label and the corresponding SRv6 segment identifier, and a next hop is an address of a loopback interface on PE2.

After receiving the route advertisement message, PE1 generates local table items, such as CE2 prefix (prefix of CE2), next hop L, VPN2, SID2; CE3 prefix (prefix of CE3), next hop L, VPN3, SID3.

There are two SR policies on PE1, which are represented as: SR policy 1 (color=C1, endpoint=L) Segment-List <M1, M2>; SR policy 2 (color=C2, endpoint=L) Segment-List <S3, S4>. Color represents an intention (such as a low delay) associated with the SR Policy, endpoint is a tail end, is an address, and Segment-List corresponds to a label stack; as known from the respective Segment-List, SR policy 1 corresponds to one MPLS path, and SR policy 2 corresponds to one SRv6 path; PE1 associates a route with a prefix of CE2 to SR policy 1 and associates a route with a prefix of CE3 to SR policy 2, according to the corresponding route policy.

PE1 receives the traffic, sent by CE1, with a target address of CE2, selects the MPLS label VPN2 corresponding to the prefix of CE2 according to SR policy 1 associated with the corresponding route, a finally encapsulated label stack is <M1, M2 and VPN2>, and VPN1 is located at bottom of the label stack; a packet is forwarded along a path P1-P2-PE2 (shown in a form of a dot-dash line in FIG. 12), after PE2 receives the packet, the packet is identified as an MPLS packet, and a current label to be processed is VPN2, and the forwarding table of the corresponding MPLS label is randomly found for forwarding the packet.

Similarly, PE1 receives the traffic, sent by CE1, with a target address of CE3, selects the SRv6 segment identifier SID3 corresponding to the prefix of CE3 according to SR policy 2 associated with the corresponding route, a finally encapsulated label stack is <S1, S2, S3, SID3>, and SID3 is a last SID to be processed in sequence in the label stack; a packet is forwarded along a path P3-P4-PE2 (shown in a form of a dotted line in FIG. 12), after PE2 receives the packet, the packet is identified as an SRv6 packet, and a current SRv6 SID to be processed is of the END.DX4 type, and then the forwarding table of the corresponding SRv6 SID is found for forwarding the packet.

Figure 13:
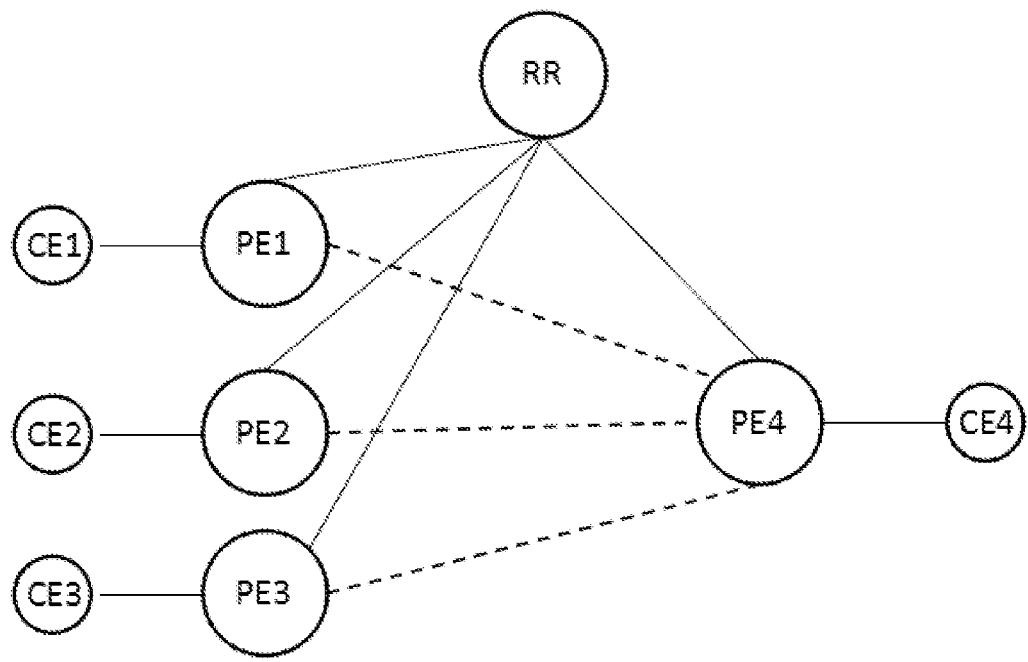
FIG. 13 is a schematic structural diagram of a networking of a virtual private network according to the present disclosure.

FIG. 13 is a schematic structural diagram of a networking of a virtual private network according to the present disclosure. As shown in FIG. 13, a first provider edge router PE1, a second provider edge router PE2, a third provider edge router PE3, and a fourth provider edge router PE4 are respectively connected to a first customer edge router CE1, a second customer edge router CE2, a third customer edge router CE3, and a fourth customer edge router CE4, PE1, PE2, PE3 and PE4 simultaneously establish a BGP neighbor relationship with a route reflector (RR), RR, PE1 and PE4 simultaneously support an MPLS architecture and an SRv6 architecture, PE2 only supports the MPLS architecture, PE3 only supports the SRv6 architecture.

PE4 does not consider capabilities of PE1, PE2 and PE3, and during sending route advertisement messages to the RR, both an MPLS label and an SRv6 SID are carried in each route advertisement message, and thereafter following various implementations may be implemented: RR only plays a role of forwarding and transparent-transferring, does not process routes, and directly advertises the routes to PE1, PE2 and PE3, PE1, PE2 and PE3, according to the capabilities thereof, store the corresponding network identifier and the corresponding route; the RR is dynamically configured according to the capabilities of PE1, PE2 and PE3, processes routes, and correspondingly sends processed routes to PE1, PE2, and PE3, the route advertisement message received by PE1 carries an MPLS label and an SRv6 SID, the route advertisement message received by PE2 only carries an MPLS label, and the route advertisement message received by PE3 does not carry an MPLS label.

In addition, if no RR exists in the networking, or PE4 directly and respectively establishes BGP neighbor relationships with PE1, PE2, and PE3, during PE4 establishing the BGP neighbor relationships with PE1, PE2 and PE3, PE1, PE2, PE3 and PE4 carry fields, indicating their own capabilities, in open messages, and during sending the route advertisement message, PE4 configures whether the route advertisement message carries an MPLS label and/or an SRv6 SID according to the capabilities of PE1, PE2, and PE3.

Figure 14:
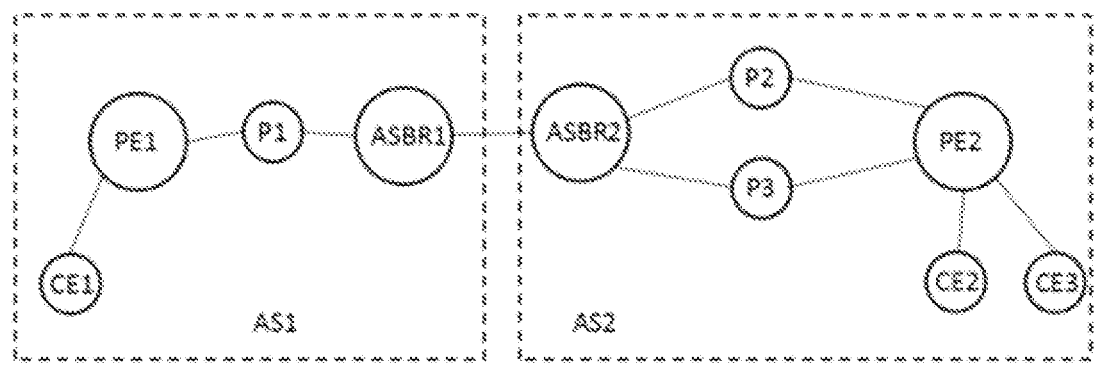
FIG. 14 is a schematic structural diagram of a networking of a virtual private network according to the present disclosure.

FIG. 14 is a schematic structural diagram of a networking in a virtual private network according to the present disclosure. As shown in FIG. 14, internal devices of two autonomous systems AS1 and AS2 perform cross-domain communication through a first autonomous system border router ASBR1 and a second autonomous system border router ASBR2, a first provider edge router PE1, a first provider core router P1 and a third provider core router P3 each only support the MPLS architecture, a second operator core router P2 only supports the SRv6 architecture, ASBR1, ASBR2 and a second provider edge router PE2 supports the MPLS architecture and the SRv6 architecture simultaneously.

A first customer edge router CE1 and a second customer edge router CE2 already belong to a VPN and are connected, and CE1 and a third customer edge router CE3 are to be connected.

In a case where the cross-domain communication adopts an option A in the existing standard, ASBR1 accesses ASBR2 in a form of a customer edge router, and in such case, ASBR2 is similar to an operator edge router for PE2, and the route is to be advertised with reference to the implementation shown in FIG. 12.

For a case where the cross-domain communication adopts an option B in the existing standard, PE2 allocates an MPLS label VPN2 and an SRv6 segment identifier SID2 to CE2, and adaptively, PE2 establishes a multi-protocol BGP (MP BGP) neighbor relationship with ASBR2, sends the route advertisement message carrying the MPLS label VPN2 and the SRv6 segment identifier SID2 to ASBR2; after receiving a VPN route advertised by PE2, ASBR2 locally allocates a VPN identifier to the route, and establishes a mapping relationship between the VPN identifier, and the VPN2 and the SID2, and then ASBR2 sends the route advertisement message to ASBR1 based on a general form, so as to complete a cross-domain route advertisement.

The present disclosure further provides an edge device, including: at least one processor; and a storage component storing at least one program; the at least one program, when executed by the at least one processor, causes the at least one processor to perform the packet processing method, applied to the first edge device, described above.

The present disclosure further provides an edge device, including: at least one processor; and a storage component storing at least one program; the at least one program, when executed by the at least one processor, causes the at least one processor to perform the packet processing method, applied to the second edge device, described above.

The present disclosure further provides a computer-readable medium having a computer program stored thereon, the computer program, when executed by a processor, causes the processor to perform at least one of the packet processing method, applied to the first edge device, or the packet processing method, applied to the second edge device, described above.

It should be understood by those of ordinary skill in the art that all or some of the operations in the method, the functional modules/components in the apparatus and system disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A packet processing method, applied to a first edge device, comprising:

sending a route advertisement message of a virtual private network to a second edge device, the route advertisement message indicating whether the first edge device supports a first network architecture and whether the first edge device supports a second network architecture, the first edge device supporting at least one of the first network architecture or the second network architecture; and receiving a second service packet sent by the second edge device, wherein, the second service packet is obtained by the second edge device in response to a first service packet according to the network architecture supported by the first edge device, wherein the route advertisement message comprises flag information, and a first network identifier and a second network identifier respectively corresponding to the first network architecture and the second network architecture, the flag information being valid indicates that the first edge device supports the first network architecture and the second network architecture, the flag information being invalid indicates that the first edge device supports the first network architecture or the second network architecture, wherein in response to that the flag information is valid, the second service packet carries the first network identifier or the second network identifier, the first network identifier or the second network identifier is selected by the second edge device according to a preset path selection strategy and is encapsulated in the second service packet.

2. The method of claim 1, wherein the first network identifier is a multi-protocol label switching (MPLS) label, and the second network identifier is a segment routing IPv6 (SRv6) segment identifier.

3. The method of claim 1, further comprising:
before the sending a route advertisement message of a virtual private network to a second edge device, configuring an instance corresponding to the virtual private network, and identifying the instance by using at least the first network identifier.

4. The method of claim 3, wherein the first edge device supports the first network architecture and the second network architecture;
the identifying the instance by using at least the first network identifier comprises:
identifying the instance by using the first network identifier and the second network identifier, and configuring at least one of a function field or an argument field of the second network identifier according to a label value of the first network identifier; or
identifying the instance by using the first network identifier, and establishing a mapping relationship between the first network identifier and the second network identifier in a forwarding table.

5. The method of claim 1, wherein the sending a route advertisement message of a virtual private network to a second edge device comprises:
establishing a border gateway protocol neighbor relationship with the second edge device, and sending the route advertisement message to the second edge device based on a border gateway protocol.

6. The method of claim 1, wherein the sending a route advertisement message of a virtual private network to a second edge device comprises:
establishing a border gateway protocol neighbor relationship with a route reflector, the route reflector establishing a border gateway protocol neighbor relationship with the second edge device and supporting the first network architecture and the second network architecture; and
sending the route advertisement message to the second edge device through the route reflector.

7. The method of claim 1, further comprising:
after the receiving a second service packet sent by the second edge device, searching a forwarding table according to the second service packet and forwarding the second service packet.

8. An edge device, comprising:
at least one processor;
a storage component storing at least one program;
the at least one program, when executed by the at least one processor, causes the at least one processor to perform the method of claim 1.

9. A non-transitory computer-readable storage medium having a computer program stored thereon, the computer program, when executed by a processor, causes the processor to perform the method of claim 1.

10. A packet processing method, applied to a second edge device, comprising:
receiving a route advertisement message of a virtual private network sent by a first edge device, the route advertisement message indicating whether the first edge device supports a first network architecture and whether the first edge device supports a second network architecture, the first edge device supporting at least one of the first network architecture or the second network architecture; and
in response to a first service packet received by the first edge device, obtaining a second service packet according to the network architecture supported by the first edge device, and sending the second service packet to the first edge device through a path corresponding to the network architecture,
wherein the route advertisement message comprises flag information, and a first network identifier and a second network identifier respectively corresponding to the first network architecture and the second network architecture, the flag information being valid indicates that the first edge device supports the first network architecture and the second network architecture, the flag information being invalid indicates that the first edge device supports the first network architecture or the second network architecture;
the packet processing method further comprises:
after the receiving a route advertisement message of a virtual private network sent by a first edge device, storing at least one of the first network identifier or the second network identifier, and storing a corresponding route,
wherein the obtaining a second service packet according to the network architecture supported by the first edge device comprises:
in response to that the flag information is valid, selecting the first network identifier or the second network identifier according to a preset path selection strategy, and encapsulating the first network identifier or the second network identifier selected in the second service packet.

11. The method of claim 10, wherein the first network identifier is a multi-protocol label switching (MPLS) label, and the second network identifier is a segment routing IPV6 (SRv6) segment identifier.

12. The method of claim 10, wherein the selecting the first network identifier or the second network identifier according to a preset path selection strategy comprises:

selecting the first network identifier or the second network identifier according to a service packet prefix or a service level agreement expectation of the first service packet.

13. The method of claim 10, wherein the selecting the first network identifier or the second network identifier according to a preset path selection strategy comprises:
sending a request of path computation to a controller, the request of path computation comprising constraint information comprising at least one of a delay expectation and a bandwidth expectation; and
receiving a result of path computation issued by the controller, selecting the first network identifier or the second network identifier according to the result of path computation,
wherein the first edge device and the second edge device each support the first network architecture and second network architecture; the request of path computation further comprises the first network identifier, the second network identifier and a multi-path computation flag, the multi-path computation flag indicates the controller to respectively compute paths corresponding to the first network identifier and the second network identifier, or indicates the controller to compute a desired path from the paths corresponding to the first network identifier and the second network identifier.

14. The method of claim 10, wherein the storing at least one of the first network identifier or the second network identifier, and storing a corresponding route comprises:
storing at least one of the first network identifier or the second network identifier according to whether at least one of the first network architecture or the second network architecture is supported by the second edge device, and storing the corresponding route; or
storing at least one of the first network identifier or the second network identifier according to a configured instance of the second edge device, and storing the corresponding route.

15. An edge device, comprising:
at least one processor;
a storage component storing at least one program;
the at least one program, when executed by the at least one processor, causes the at least one processor to perform the method of claim 10.

16. A non-transitory computer-readable storage medium having a computer program stored thereon, the computer program, when executed by a processor, causes the processor to perform the method of claim 10.

17. A packet processing method, applied to a second edge device, comprising:
receiving a route advertisement message of a virtual private network sent by a first edge device, the route advertisement message indicating whether the first edge device supports a first network architecture and whether the first edge device supports a second network architecture, the first edge device supporting at least one of the first network architecture or the second network architecture; and
in response to a first service packet received by the first edge device, obtaining a second service packet according to the network architecture supported by the first edge device, and sending the second service packet to the first edge device through a path corresponding to the network architecture,
wherein the route advertisement message comprises flag information, and a first network identifier and a second network identifier respectively corresponding to the first network architecture and the second network architecture, the flag information being valid indicates that the first edge device supports the first network architecture and the second network architecture, the flag information being invalid indicates that the first edge device supports the first network architecture or the second network architecture;
the packet processing method further comprises:
after the receiving a route advertisement message of a virtual private network sent by a first edge device, storing at least one of the first network identifier or the second network identifier, and storing a corresponding route,
wherein the storing at least one of the first network identifier or the second network identifier, and storing a corresponding route comprises:
storing at least one of the first network identifier or the second network identifier according to whether at least one of the first network architecture or the second network architecture is supported by the second edge device, and storing the corresponding route; or
storing at least one of the first network identifier or the second network identifier according to a configured instance of the second edge device, and storing the corresponding route.

* * * * *